US010279869B2

(12) United States Patent
Herrington et al.

(10) Patent No.: US 10,279,869 B2
(45) Date of Patent: May 7, 2019

(54) BACKSPRAY MITIGATION SYSTEM FOR YACHTS

(71) Applicants: Frederick Herrington, Merritt Island, FL (US); George Lewis, Merritt Island, FL (US); John Scherer, Merritt Island, FL (US); Joshua Hodges, Merritt Island, FL (US)

(72) Inventors: Frederick Herrington, Merritt Island, FL (US); George Lewis, Merritt Island, FL (US); John Scherer, Merritt Island, FL (US); Joshua Hodges, Merritt Island, FL (US)

(73) Assignee: BRUNSWICK CORPORATION, Lake Forest, IL (US)

( * ) Notice: Subject to any disclaimer, the term of this patent is extended or adjusted under 35 U.S.C. 154(b) by 0 days.

(21) Appl. No.: 15/618,011

(22) Filed: Jun. 8, 2017

(65) Prior Publication Data

US 2017/0355425 A1 Dec. 14, 2017

Related U.S. Application Data

(60) Provisional application No. 62/347,988, filed on Jun. 9, 2016.

(51) Int. Cl.
| B63B 17/00 | (2006.01) |
| B63B 17/02 | (2006.01) |
| B29C 53/80 | (2006.01) |
| B63B 15/00 | (2006.01) |
| B63J 2/10 | (2006.01) |

(52) U.S. Cl.
CPC .......... B63B 17/02 (2013.01); B29C 53/8008 (2013.01); B63B 15/00 (2013.01); B63J 2/10 (2013.01)

(58) Field of Classification Search
CPC ...... B63B 17/00; B63B 15/00; B29C 53/8008
See application file for complete search history.

(56) References Cited

U.S. PATENT DOCUMENTS

| 3,018,784 | A | 1/1962 | Buxman |
| 5,052,326 | A | 10/1991 | Wiggen et al. |
| 5,382,070 | A | 1/1995 | Turner |
| 5,628,265 | A | 5/1997 | Azima et al. |
| 5,791,952 | A | 8/1998 | Trinkl |
| 6,253,702 | B1 | 7/2001 | Schoeller, Jr. |
| 7,481,177 | B2 | 1/2009 | Hearne |

(Continued)

FOREIGN PATENT DOCUMENTS

EP 2488406 3/2014

*Primary Examiner* — Stephen P Avila
(74) *Attorney, Agent, or Firm* — Malin Haley DiMaggio & Bowen, P.A.

(57) ABSTRACT

A superstructure-integrated backspray mitigation system for yachts including an aft spoiler secured to the vessels hardtop for directing airflow about the hardtop downwardly into the aft cockpit area to interfere with, mitigate and eliminate the natural reverse backspray created by the low-pressure region behind the yacht. The spoiler protrudes from the hardtop and includes at least one air ducting channel directing airflow at select angles into the cockpit area presenting a protective shield preventing the backspray from entering the cockpit. An optional pivotal panel member selectively enables operation of the spoiler.

22 Claims, 15 Drawing Sheets

(56) References Cited

U.S. PATENT DOCUMENTS

| | | |
|---|---|---|
| 7,810,443 B2 | 10/2010 | Preiss |
| 8,925,475 B2 | 1/2015 | Harbin |
| 9,371,098 B2 * | 6/2016 | Yamaguchi .......... B62D 35/007 |
| 9,688,363 B1 * | 6/2017 | Marshall ................ B63B 29/02 |
| 2008/0264324 A1 | 10/2008 | Preiss |
| 2013/0319310 A1 | 12/2013 | Harbin |

* cited by examiner

BACKSPRAY MITIGATION SYSTEM FOR YACHTS

CROSS REFERENCE TO RELATED APPLICATIONS

This application claims the benefit of provisional U.S. patent application Ser. No. 62/347,988, filed on Jun. 9, 2016.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention generally relates to marine vessels and watercraft and more particularly to specially designed air flow management apparatus for yachts for mitigating backspray while underway.

2. Description of Related Art

When a large object such as a yacht, truck, or plane moves through air, it creates a region of low-pressure behind the object. The low-pressure region can actually draw air from behind the object into its wake. This can create a reverse flow that moves faster than the object creating low-pressure area, such that the flow reaches the trailing edge of the object's structure.

In the context of large marine vessels and yachts, the low-pressure region that develops behind the superstructure can create swirling turbulent airflow strong enough to carry spray, and water vapor into the cockpit as the vessel travels through the water. This is called "backspray", and backspray can quickly thoroughly cover and soak the cockpit area of the vessel, as well as any passengers or gear that happens to be in the area. This is a very common and highly undesirable occurrence, requiring routine maintenance and cleaning of both the vessel and equipment.

Current trends in yacht design place a greater premium on standing headroom in staterooms and salon areas. Historically these areas often did not have standing headroom, particularly on smaller yachts ranging up to 50 feet in length. As a result, the hull and superstructure cross-section was not large enough to create a low-pressure region behind the vessels which would generate significant backspray. Modern yacht designs, however, are characterized as having ever increasing lengths, beams, hull sizes, and heights. Modern designs also feature standing headroom on both decks making them exceedingly taller as well. Thus, modern vessel designs have been found to experience considerable backspray problems.

The current state-of-the-art fails to adequately address or combat the problem of backspray on large vessels. Typically yacht designs attempt to offset this problem by reducing the cross-section of the vessel superstructure, which has minimal or no effect, and runs contrary to the trends in yacht designs and places limitations on size.

It is, therefore, to the effective resolution of the aforementioned problems and shortcomings of the prior art that the present invention is directed. However, in view of the marine yacht designs in existence at the time of the present invention, it was not obvious to those persons of ordinary skill in the pertinent art as to how the identified needs could be fulfilled in an advantageous manner.

SUMMARY OF THE INVENTION

In order to mitigate and eliminate the backspray phenomenon occurring with respect to larger yachts, the instant invention incorporates airflow management apparatus, such as a spoiler having specialized geometry to redirect airflow streamlines so as to disrupt the low-pressure region behind the vessel by funneling air into the cockpit area. When this occurs areas of deleterious reversed flow behind the vessel are interfered with and prevented from developing, such that the backspray is prevented from flowing into the cockpit area where people, gear and equipment are located.

In order to redirect the flow of air to mitigate backspray, the present invention incorporates a specially designed and oriented airflow management apparatus, such as a spoiler positioned about the hardtop to capture and redirect air that flows across the superstructure. In a preferred embodiment the spoiler is incorporated into the vessel superstructure. Downstream of the leading edge of the spoiler a duct channels and redirects the captured airflow for discharge into the cockpit area for the maximum effect as described hereinafter. The size and orientation of the channel can vary to optimize the mitigation system for a particular design. It will, however, direct the air running over the top of the hardtop from a generally horizontal flow, through an outlet in the fiberglass above the cockpit seating area. The outlet angle may be approximately 45° to 75° below the horizontal to best disrupt the backspray generated by the low-pressure region which develops behind the moving vessel.

Accordingly, it is an object of the present invention to provide a backspray mitigation system for yachts that is solves the aforementioned problems.

It is another object of the present invention to provide a backspray mitigation system for yachts that incorporates a specialized spoiler and air foil which redirects hardtop air flow into the cockpit area to mitigate and prevent deleterious reverse air and water vapor flow from occurring and entering the cockpit area.

It is another object of the present invention to provide a backspray mitigation system for yachts which incorporates accessory features and components to enhance its operation and effects.

Still another object of the present invention is to provide a backspray mitigation system that is integrated into the vessel superstructure.

Finally, it is an object of the present invention to provide a backspray mitigation system for yachts which is cost effective and operational efficient, and incorporates all the above features and objects.

In accordance with these and other objects which will become apparent hereinafter, the instant invention will now be described with particular reference to the accompanying drawings.

DETAILED DESCRIPTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1A:
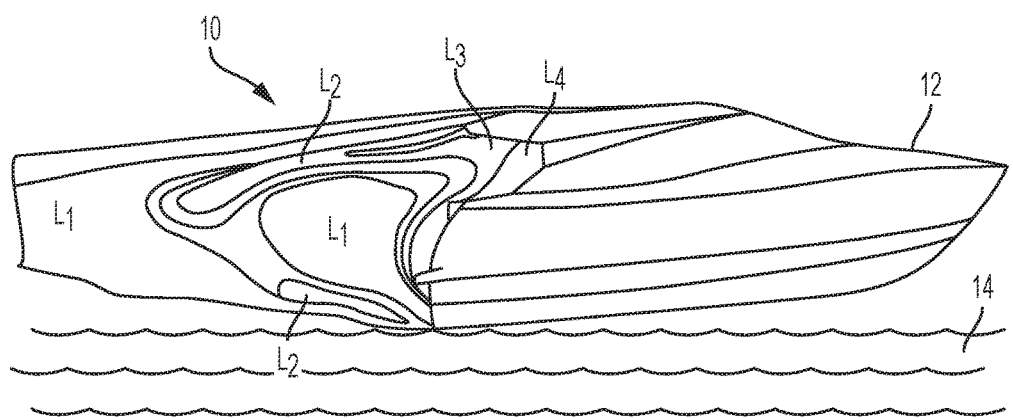
FIG. 1A is a cross-sectional centerline side profile view of the low-pressure region field developed behind a large yacht of current designs.

Turning now to the drawings, FIG. 1A is a cross-sectional centerline side profile view illustrating a region of low-pressure, generally referenced as 10, which develops behind a high-profile large yacht 12 in accordance with current design standards (prior to being modified in accordance with the present invention) traveling through a body of water 14. This low-pressure region is illustrated using pressure gradient lines, with decreasing pressure regions illustrated as L1, L2, L3, and L4 (wherein L4 indicates the lowest of the pressure regions). As seen in FIG. 1A, a significant are of low-pressure, referenced as L4, forms in proximity to the vessel cockpit 13. As used herein the term "cockpit" shall be broadly construed to include the area forward of the vessel transom at least until the closure 13A separating the cockpit area from the enclosed salon area.

Figure 1B:
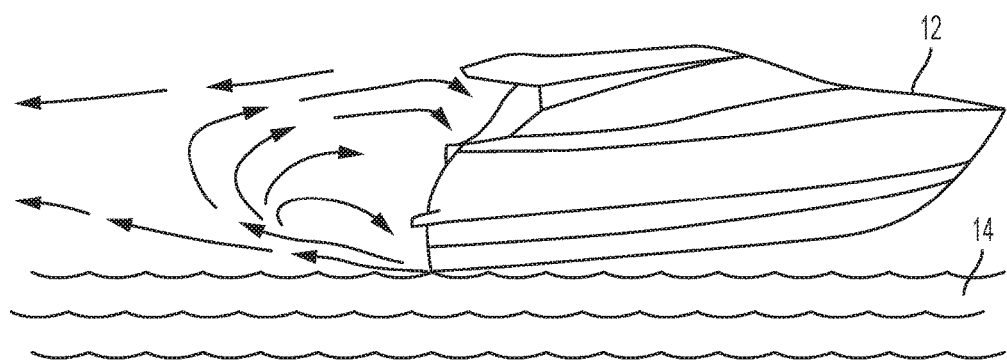
FIG. 1B is a cross-sectional centerline side profile view of the resulting backspray generated by the low-pressure region developed by behind the large yacht illustrated in FIG. 1A.

FIG. 1B illustrates the resulting backspray airflow, referenced by the flow arrows, generated by the low-pressure regions and which generates undesirable backspray bringing water and vapors into the vessel cockpit. This low-pressure region thus develops aft of the vessel and creates an airflow into the stern area cockpit which is powerful enough to carry spray and water vapor stirred up by the vessel when traveling through the water. This is referred to as "backspray." Backspray can be in such quantity to quickly drench the cockpit area of the vessel, along with occupants, gear and equipment located in the area. The recirculation of the air, spray and water vapor is readily apparent and actually recirculates 180° in the change of direction, directly into the large cockpit area. As should be apparent, having the cockpit area drenched with backspray can create significant problems and require substantial cleaning and maintenance of the cockpit area and anything in the cockpit, as well as is extremely undesirable and annoying to the vessel passengers an owner.

Figure 2A:
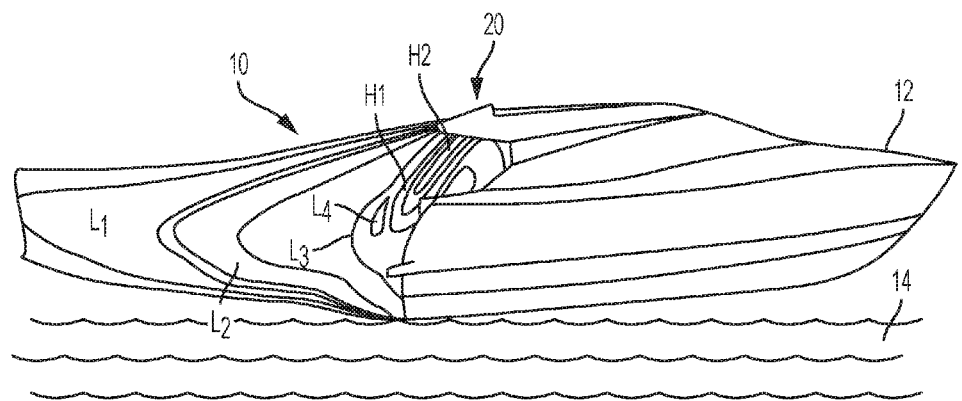
FIG. 2A is a cross-sectional centerline side profile view of the modified state, caused by the instant invention, of the low-pressure region field developed behind a large yacht with an extended hardtop.
Figure 2B:
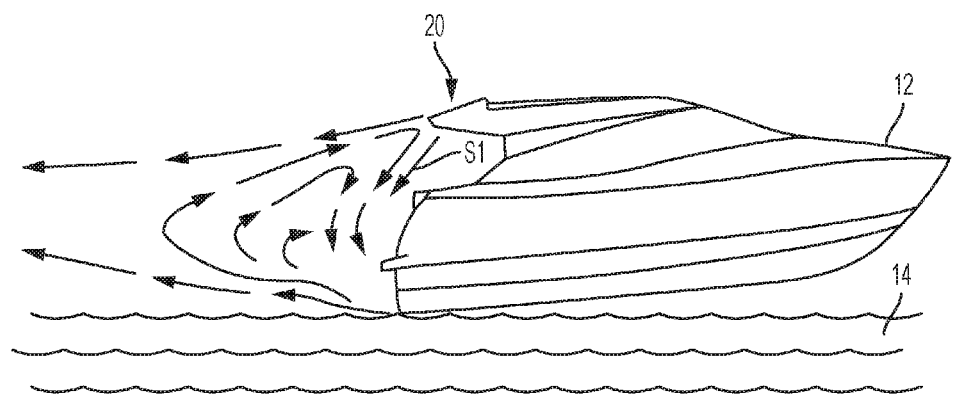
FIG. 2B is a cross-sectional centerline side profile view of the modified state, caused by the instant invention, of the backspray mitigating airflow developed behind the large yacht with an extended hardtop illustrated in FIG. 2A.

FIG. 2A is a cross-sectional centerline side profile view of the pressure region 10 developed behind a large yacht 12 having an extended hardtop 16 adapted with a superstructure incorporated backspray mitigation spoiler, generally referenced as 20, in accordance with the present invention. This low-pressure region is illustrated using pressure gradient lines, with decreasing pressure regions illustrated as L1, L2, L3, and L4 (wherein L4 indicates the lowest of the low-pressure regions), and further illustrates a higher pressure region illustrated H1 and H2 (wherein H2 is the highest of the high pressure regions). FIG. 2B illustrates the resulting backspray airflow, referenced by the flow arrows, generated by the low-pressure regions. Also depicted is an airflow stream, referenced as S1, which is diverted into or directly behind the cockpit by the superstructure incorporated backspray mitigation spoiler 20 thereby disrupting the airstreams as shown in FIG. 2B such that backspray is prevented from entering the cockpit area. Accordingly, reversed airflow within the low-pressure region is broken up, interfered with, and prevented by higher velocity air which is scooped and/or redirected into the cockpit area.

Figure 3A:
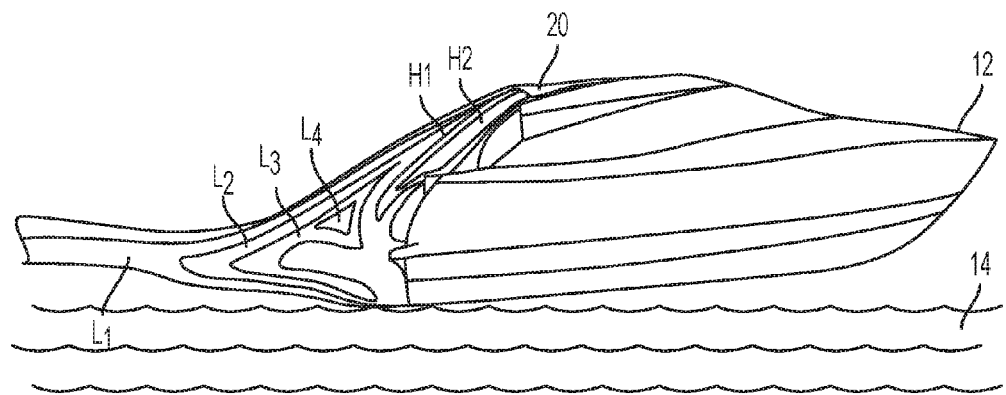
FIG. 3A is a cross-sectional centerline side profile view of the modified state, caused by the instant invention, of the low-pressure region field developed behind a large yacht without an extended hardtop.
Figure 3B:
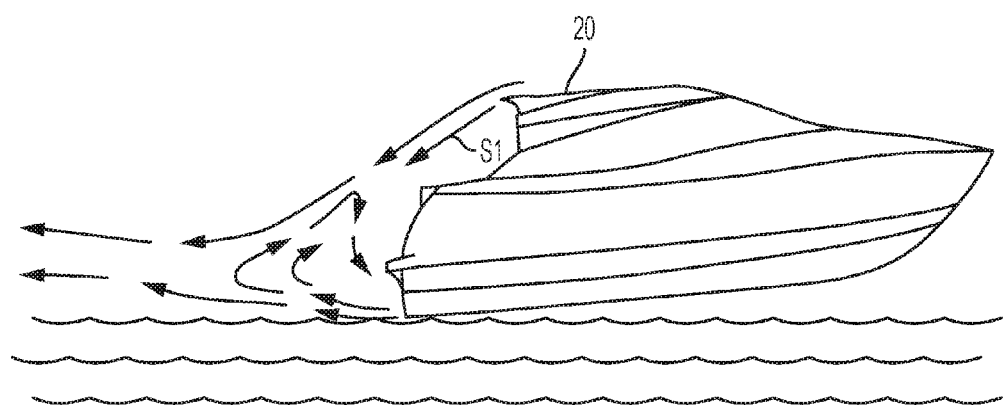
FIG. 3B is a cross-sectional centerline side profile view of the modified state, caused by the instant invention, of the backspray mitigating airflow developed behind a large yacht without an extended hardtop.

FIG. 3A is a cross-sectional centerline side profile view of the pressure region 10 developed behind a large yacht 12 without an extended hardtop but adapted with a superstructure incorporated backspray mitigation spoiler, generally referenced as 20, in accordance with the present invention. This low-pressure region is illustrated using pressure gradient lines, with decreasing pressure regions illustrated as L1, L2, L3, and L4 (wherein L4 indicates the lowest of the low-pressure regions), and further illustrates a higher pressure region illustrated H1 and H2 (wherein H2 is the highest of the high pressure regions). FIG. 3B illustrates the resulting backspray airflow, referenced by the flow arrows, generated by the low-pressure regions. Also depicted is an airflow stream, referenced as S1, which is diverted into or directly behind the cockpit by the superstructure incorporated backspray mitigation spoiler 20 thereby disrupting the airstreams as shown in FIG. 3B such that backspray is prevented from entering the cockpit area.

Figure 4:
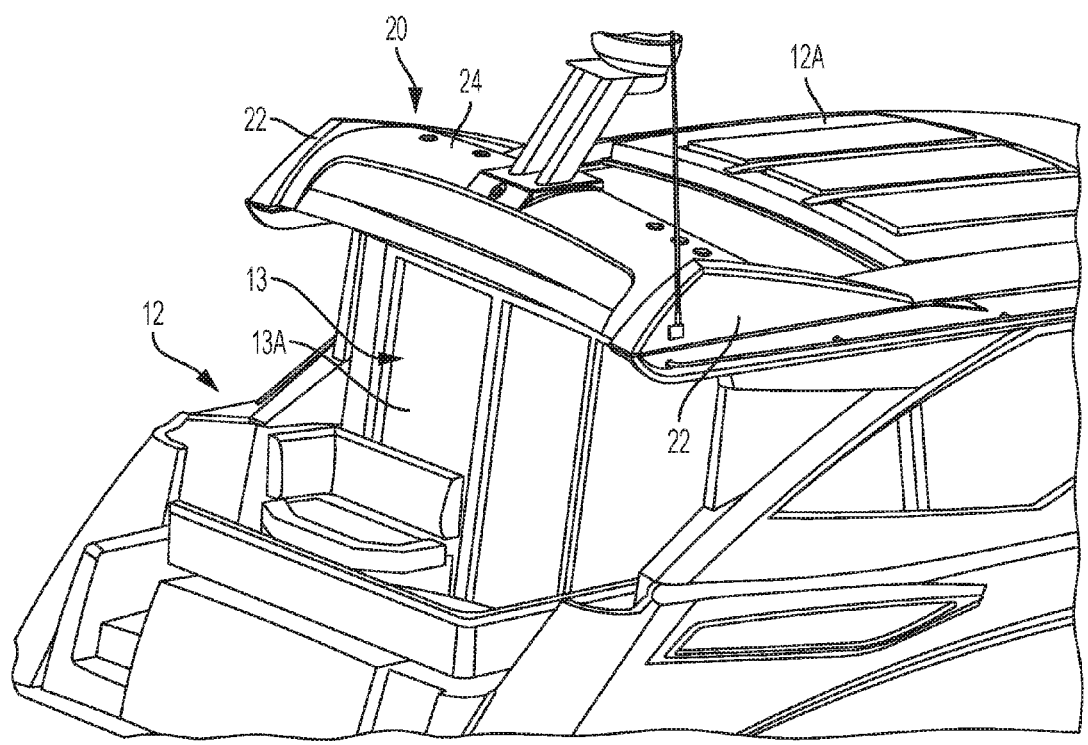
FIG. 4 is a partial top perspective view of the instant invention incorporated in conjunction with the vessel's hardtop.
Figure 5:
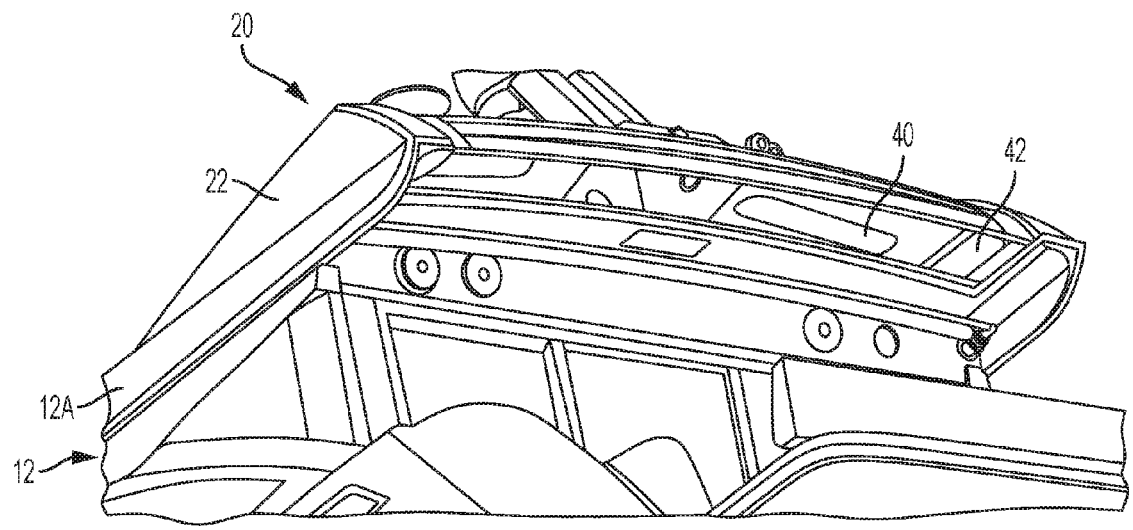
FIG. 5 is a partial bottom perspective view of the instant invention incorporated in conjunction with the vessel's hardtop.
Figure 6:
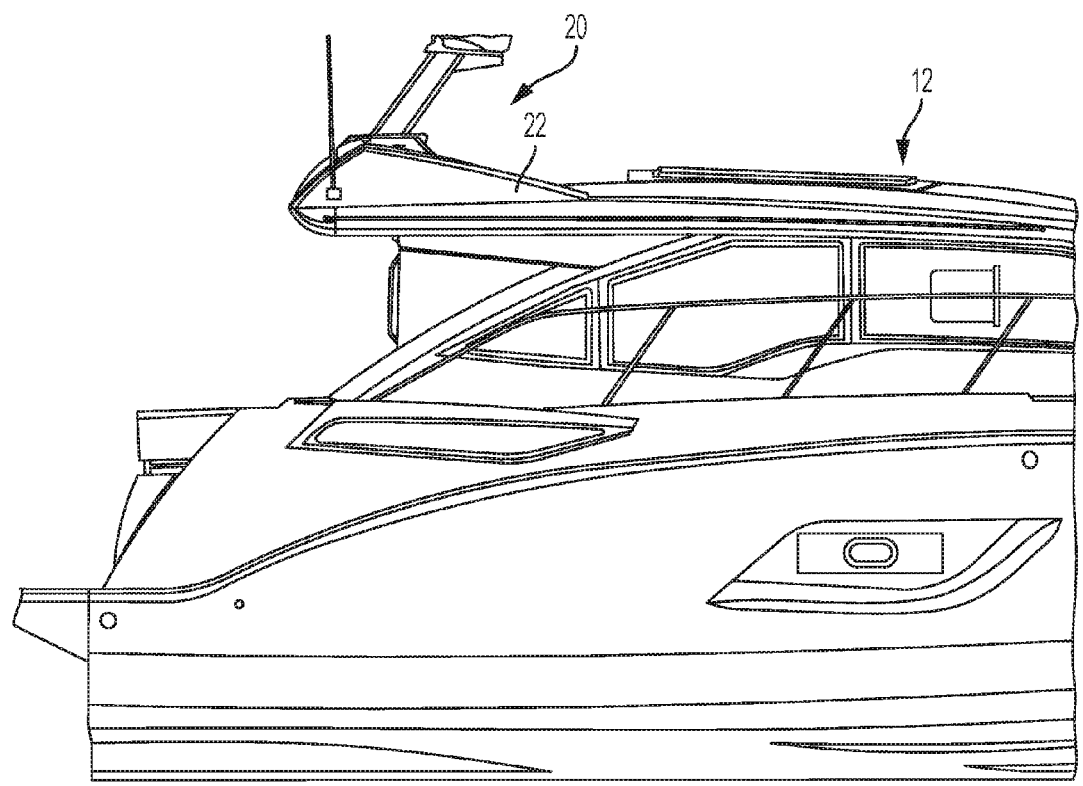
FIG. 6 is a partial side plan profile view of the instant invention incorporated in conjunction with the vessel's hardtop.
Figure 7:
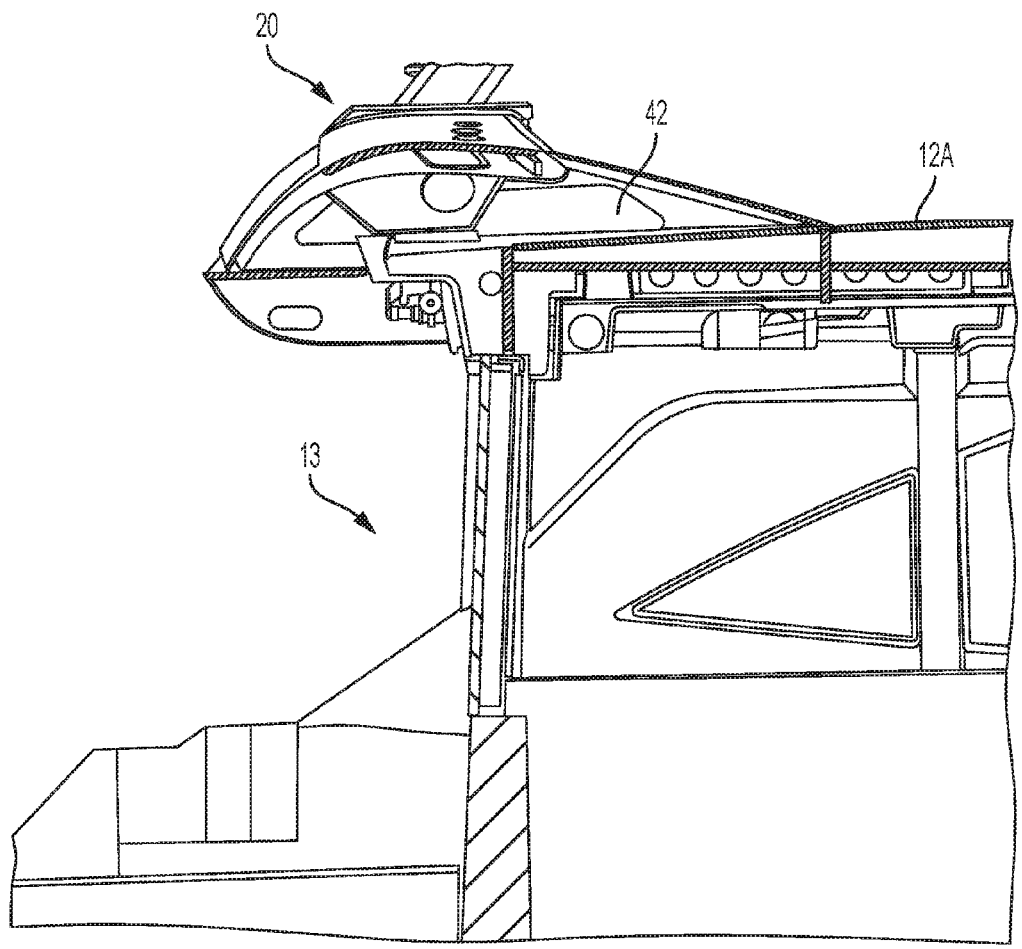
FIG. 7 is a partial cross-sectional side plan profile view of the instant invention incorporated in conjunction with the vessel's hardtop.
Figure 8:
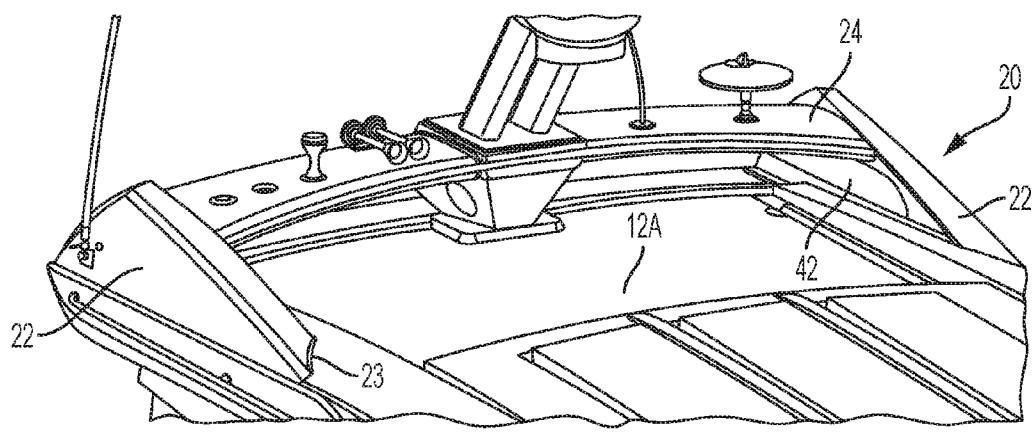
FIG. 8 is a partial top forward perspective view of the instant invention incorporated in conjunction with the vessel's hardtop.
Figure 9:
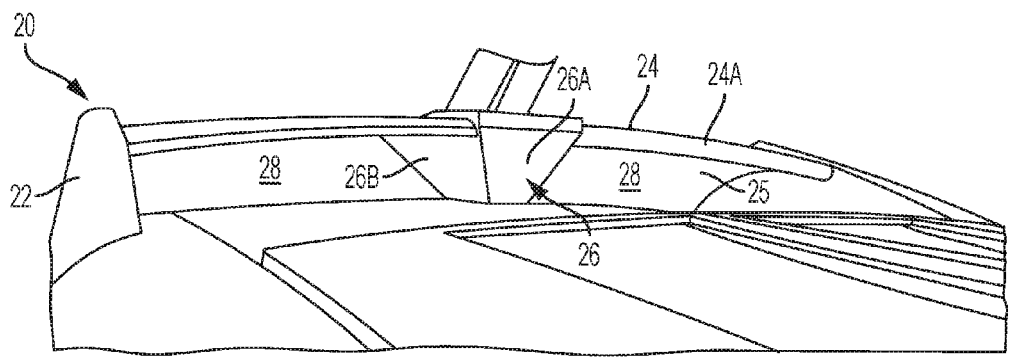
FIG. 9 is a partial front perspective view of the spoiler component incorporated into the vessel's hardtop.
Figure 10:
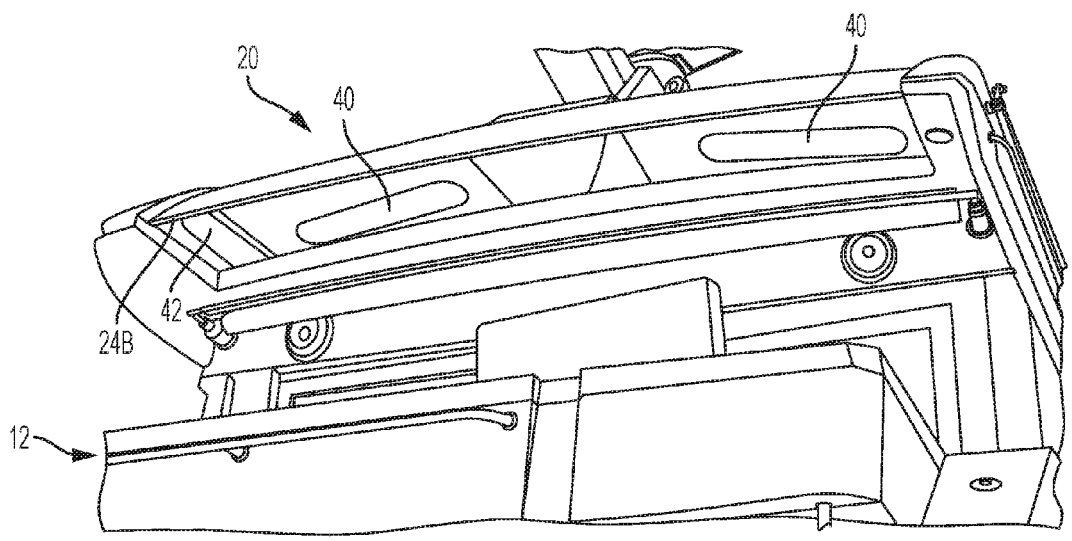
FIG. 10 is a partial bottom perspective view of the spoiler component incorporated into the vessel's hardtop.
Figure 11:
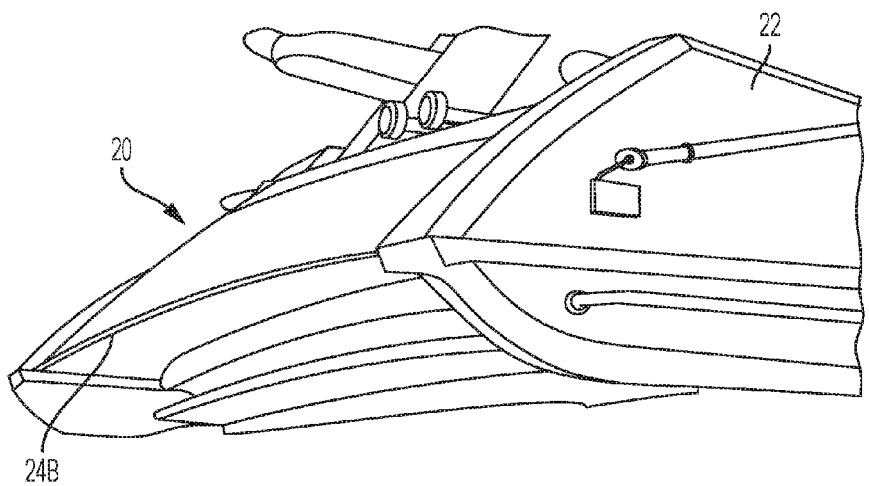
FIG. 11 is a partial rear-side perspective view of the spoiler component of the instant invention incorporated into the vessel's hardtop.
Figure 12:
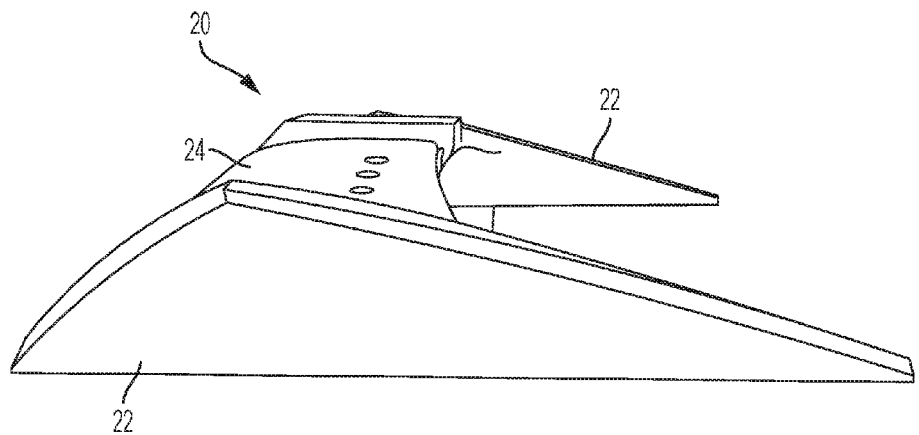
FIG. 12 is a top-side perspective view of the spoiler component of the instant invention.

FIGS. 4-11 illustrate a superstructure-incorporated backspray mitigation spoiler, generally referenced as 20, in accordance with the present invention integrally installed on the yacht. Spoiler 20 may be fabricated from any suitable material, including without limitation, fiberglass, carbon composite, or marine grade aluminum. Spoiler 20 is positioned about the hardtop 12A of vessel 12 to capture air flowing across the top of the superstructure and redirect that air into or directly aft of the cockpit/salon area. Spoiler 20 preferably includes opposing left and right side structural members, referenced as 22, and a spoiler arch structure 24 extending between the left and right side structural members 22. Structural members 22 function as arch supporting pillars for spoiler arch 24, and are preferably securely mounted at the right/starboard and left/port edges of the hardtop. The left and right side structural members 22 have bottom surfaces shaped for mating mounted engagement with the hardtop 12A of vessel 12 as best seen in FIGS. 4, 6, and 8. The spoiler arch structure may further include a center mount 26 projecting downward from spoiler arch 24. Center mount 26 further includes a bottom surface shaped for mating engagement with the hardtop 12A of vessel 12 as best illustrated in FIG. 8. The rear end of spoiler 20 preferably overhangs the cockpit area of the vessel. This may be accomplished by simple cantilevered extension of the rear end, or by formation of a cutout in the hardtop structure as illustrated in FIG. 5.

When operatively mounted, a pair of air ducting channels, referenced as 28 are formed. Each channel 28 is bounded at the bottom by the vessel hardtop 12A, bounded at the top by the underside 25 of the spoiler arch 24, bounded on one side by the inner surface of one of the side structural members 22, and bounded on the other side by an outer surface of center mount 26. Spoiler arch 24 includes a leading edge 24A, and a rearwardly and downwardly curved surface terminating in a trailing edge 24B. It is important that there exists a sufficient separation between leading edge 24A and trailing edge 24B to prevent sunlight from directly entering the cockpit area through spoiler structure 20. As should now be apparent, when the vessel 12 is underway, superstructure integrated spoiler 20 functions to collect and divert air flowing across the top of the vessel into, or immediately aft of the cockpit area. In particular, air flow enters the air ducting channels 28 at an inlet disposed at the leading edge 24A under spoiler arch 24 of spoiler 20, whereby the air is ducted rearward and downward by the curved inner surface defined aft of the spoiler arch until discharged through an outlet disposed at the trailing edge 24B. The discharge angle is preferably between approximately 45° to 75° below the horizontal to best disrupt the low-pressure region and associated backspray that would otherwise develop in the cockpit area.

Figure 13:
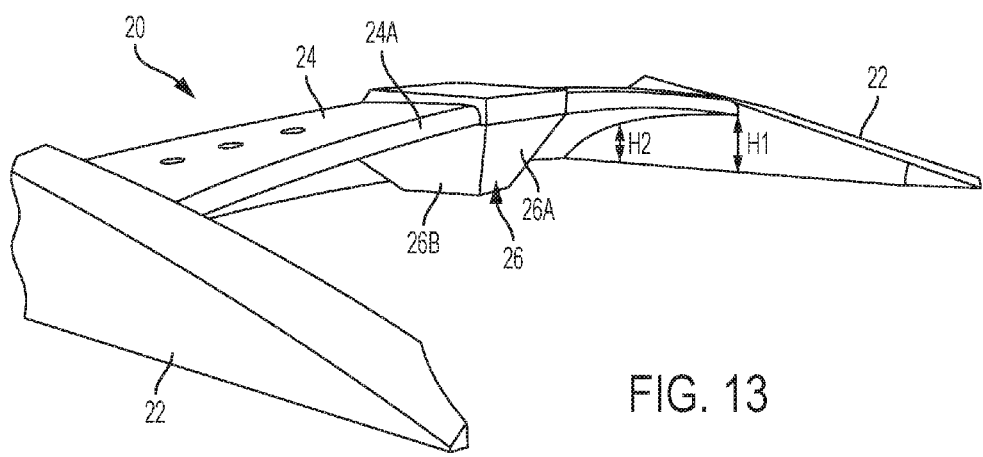
FIG. 13 is a top-front perspective view of the spoiler component of the instant invention.
Figure 14:
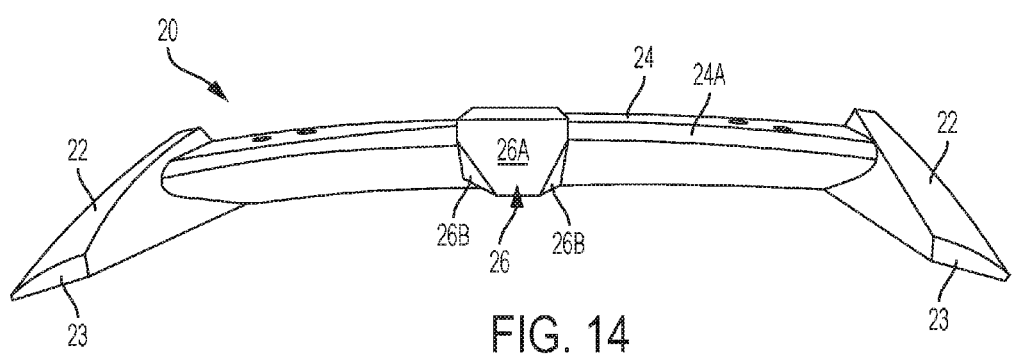
FIG. 14 is a front view of the spoiler component of the instant invention.

A further significant aspect of the present invention relates to the use of variable air ducting channel geometry to maximize backspray mitigation. In accordance with this aspect of the present invention, superstructure integrated spoiler 20 incorporates air ducting channels 28 having cross-sectional areas that reduce in area from the leading edge 24A to the trailing edge 24B. This aspect of the invention involves several specific structural elements. First, the vertical dimensions (i.e. height) of air ducting channels 28 reduce from the leading edge 24A to the trailing edge 24B. Since the vessel hardtop 12A is relatively horizontally planar, this reduction is achieved by providing the underside surface 25 of spoiler arch 20 with a downward slope such that the distance between the vessel hardtop 12A and surface 25 reduces from that realized at the leading edge 24A. FIG. 13 illustrates this vertical dimensional reduction, with the vertical dimension of H1 depicted at the leading edge and a reduced vertical dimension of H2 depicted aft of the leading edges. This dimensional reduction creates a variable air channel ducting geometry that functions to increase the velocity of the air as it moves through the spoiler structure.

Another significant aspect relating to variable air channel ducting geometry involves reducing the width of the air channel rearward of the leading edge. In accordance with this aspect of the present invention, the spacing between various side surfaces of superstructure integrated spoiler 20 are configured to reduce in dimension from maximum dimensions disposed at the forward end to minimum dimensions disposed aft of the forward end. A first horizontal or lateral dimensional reduction is achieved at the extreme front end left and right side structural members 22, wherein a beveled tip 23, best seen in FIGS. 8 and 13-15 and 18, functions to funnel air inward wherein the dimensional reduction increases air flow velocity to achieve maximum effect upon discharge. A second horizontal dimensional reduction is achieved within the air ducting channels 28. As noted above, each air ducting channel 28 is bounded at the bottom by the vessel hardtop 12A, bounded at the top by the underside 25 of the spoiler arch 24, bounded on one side by the inner surface of one of the side structural members 22, and bounded on the other side by an outer surface of center mount 26. Center mount 26 includes a front surface 26A, side surfaces 26B, a rear surface 26C, and a bottom surface 26D. Surfaces 26A-C may be generally characterized as being trapezoidally shaped with the narrow ends thereof intersecting bottom surface 26D. As a result of this geometry, the side surfaces 26B of center mount 26 are generally laterally inclined toward side structural members 22 when viewed in the direction of air flow (e.g. from leading edge to trailing edge) thereby defining a narrowing air channel geometry which further functions to increase air flow velocity.

Figure 15:
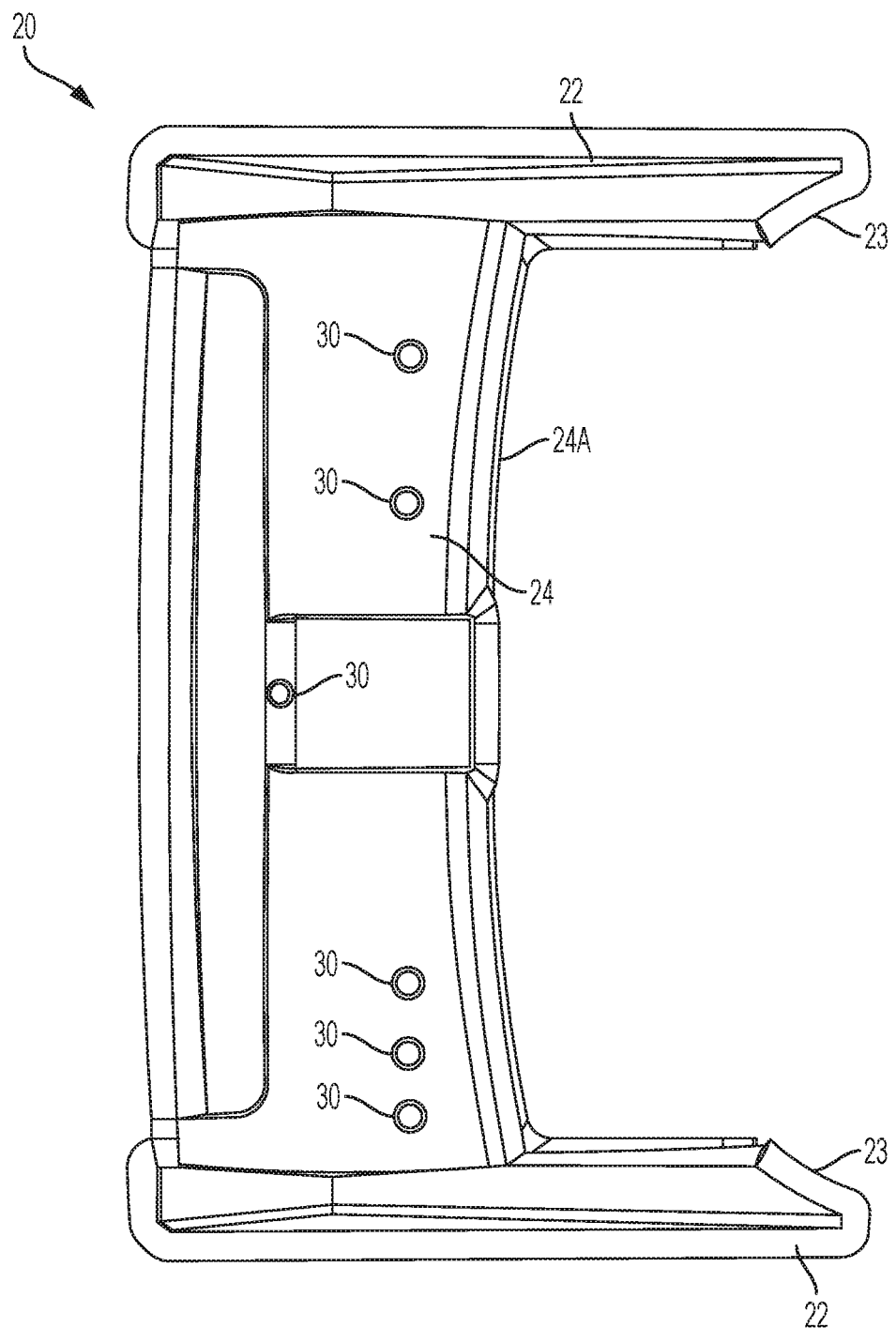
FIG. 15 is a plan view of a spoiler of the instant invention.
Figure 16:
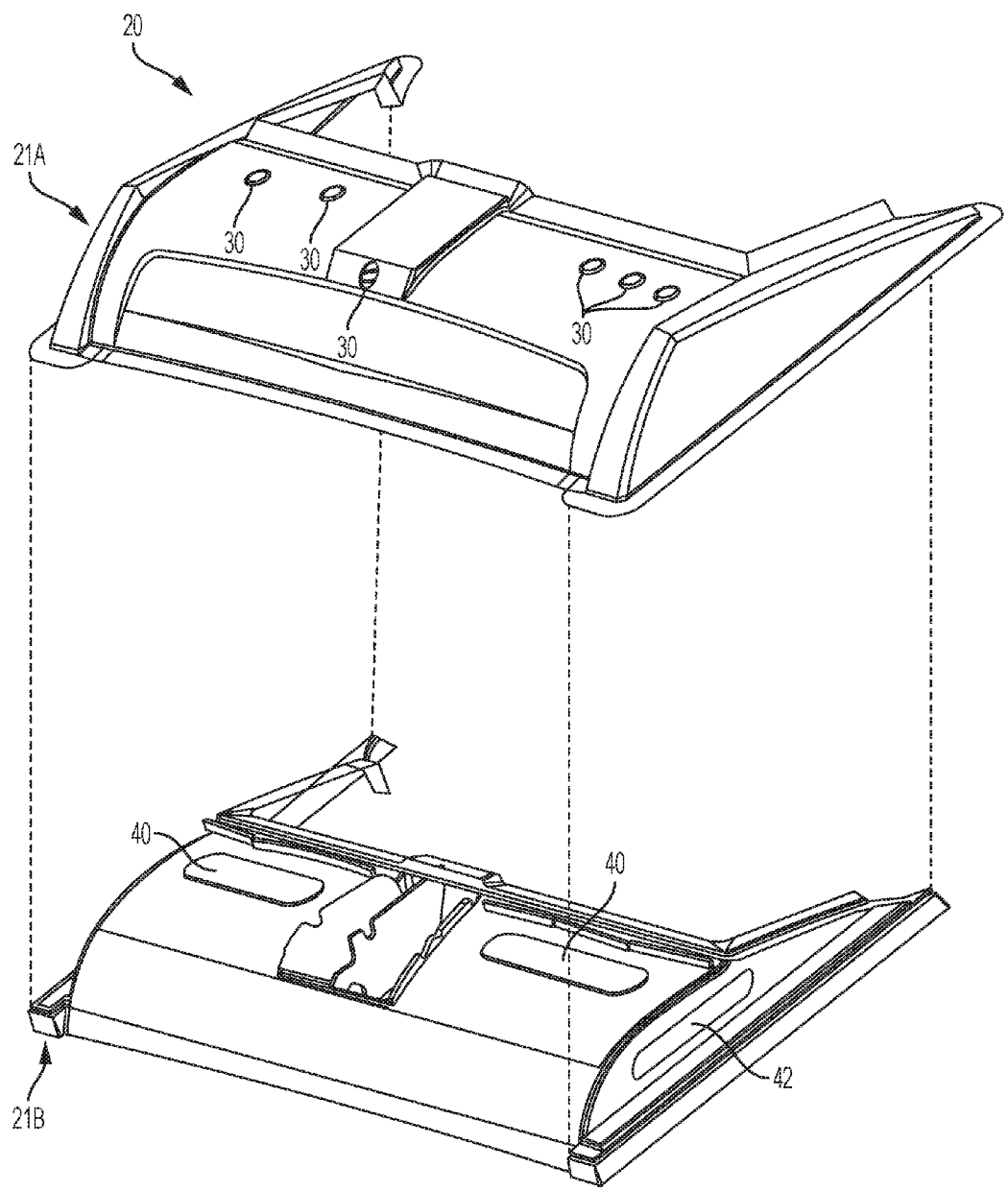
FIG. 16 is a top-rear exploded perspective view with upper and lower spoiler arches illustrated in exploded relation.
Figure 17:
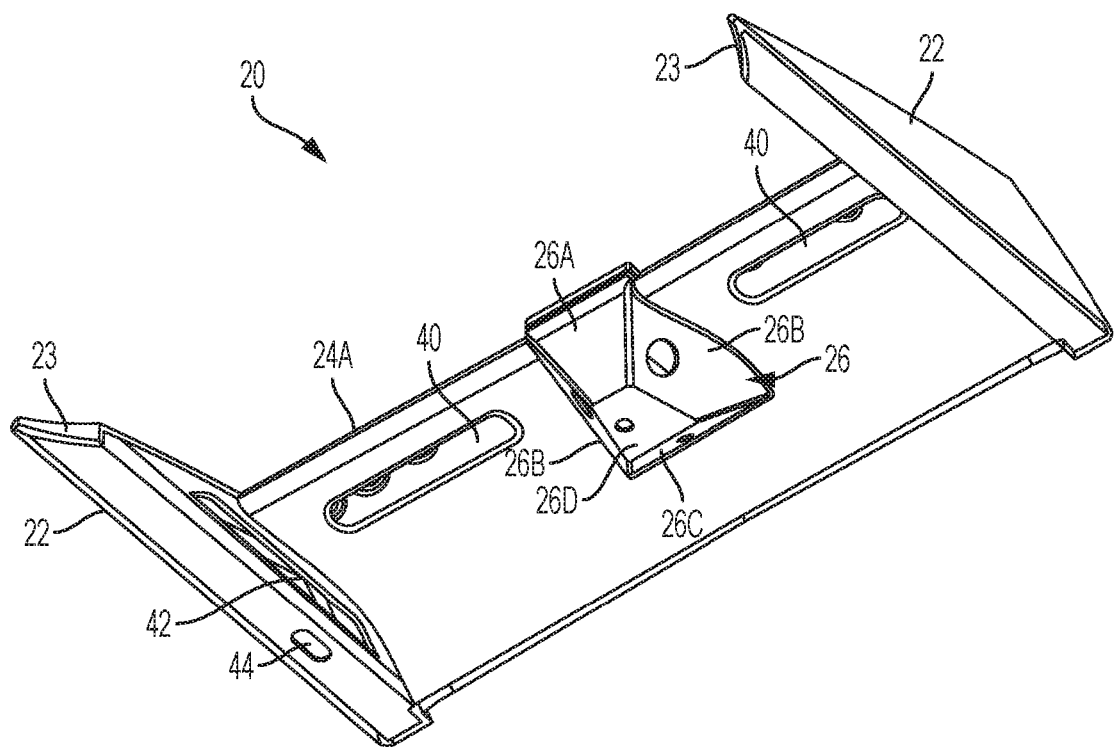
FIG. 17 is a bottom perspective view of the spoiler arch of the instant invention.
Figure 18:
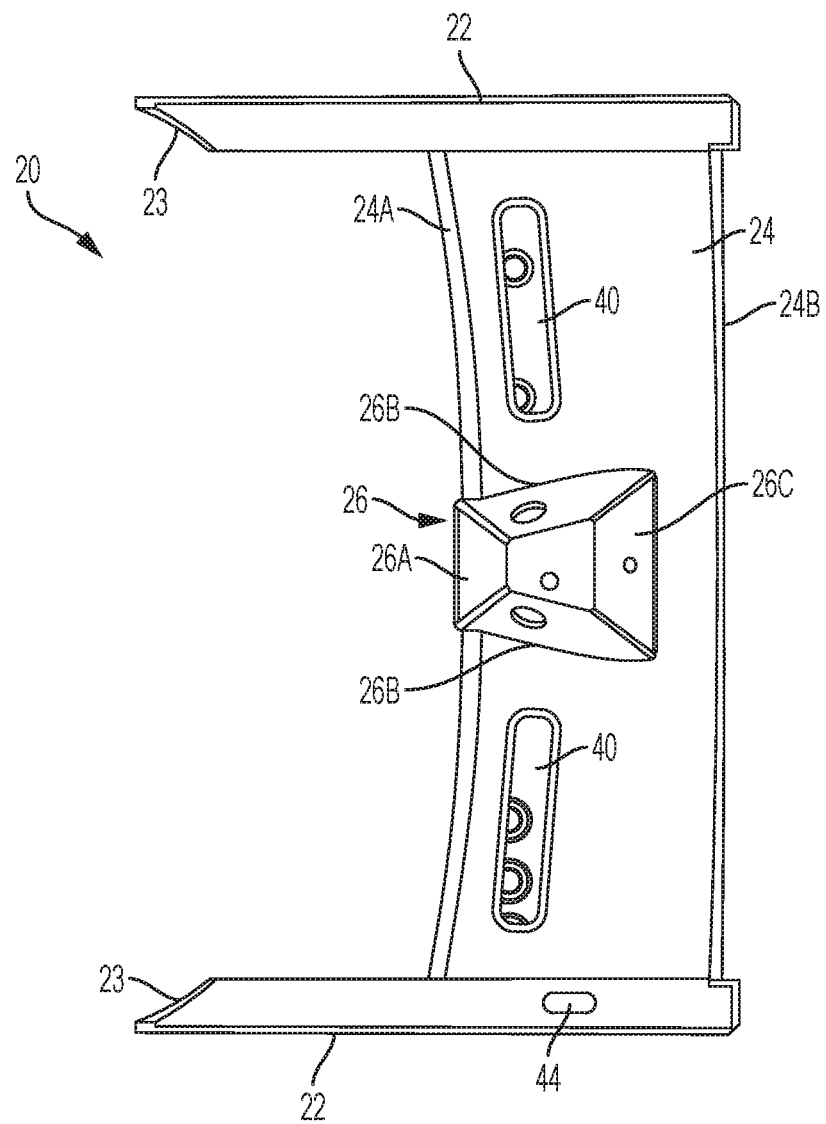
FIG. 18 is a bottom plan view of the spoiler arch of the instant invention.
Figure 19:
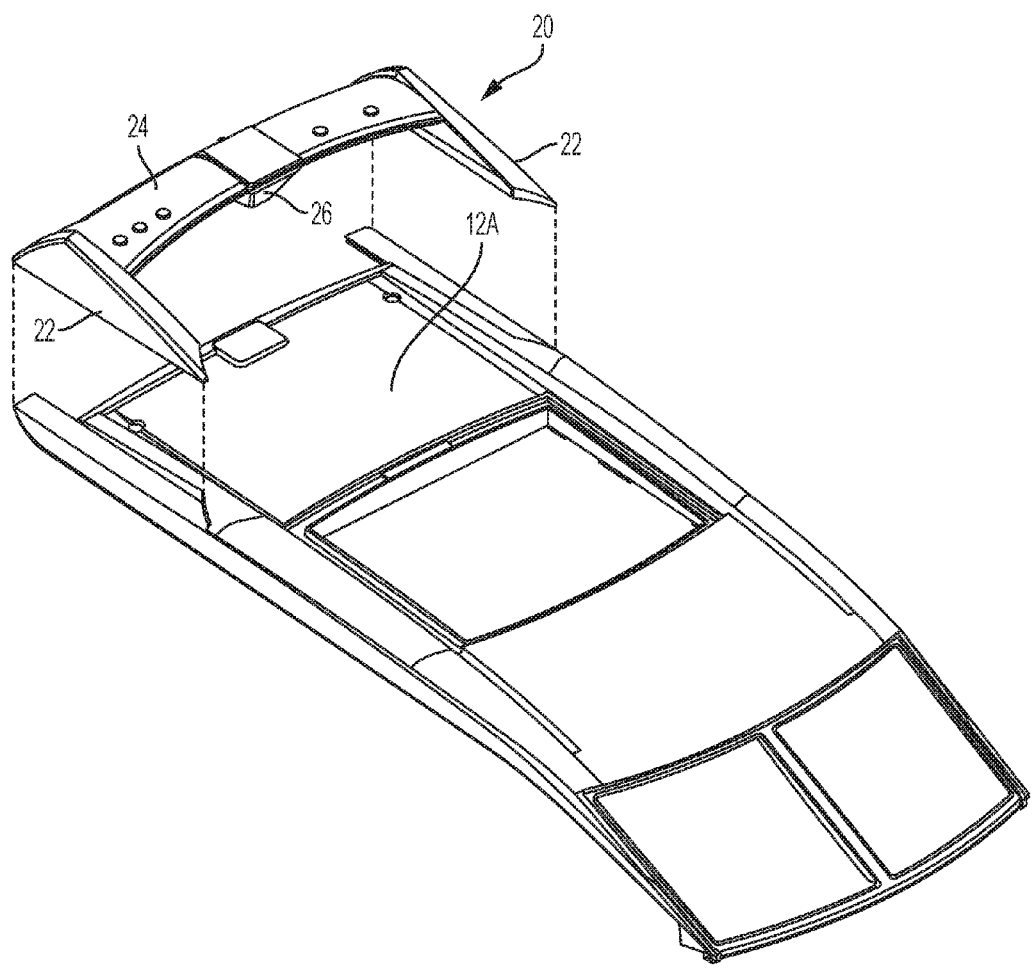
FIG. 19 is a top perspective view of the spoiler arch of the instant invention prior to installation on a vessel hardtop.
Figure 20:
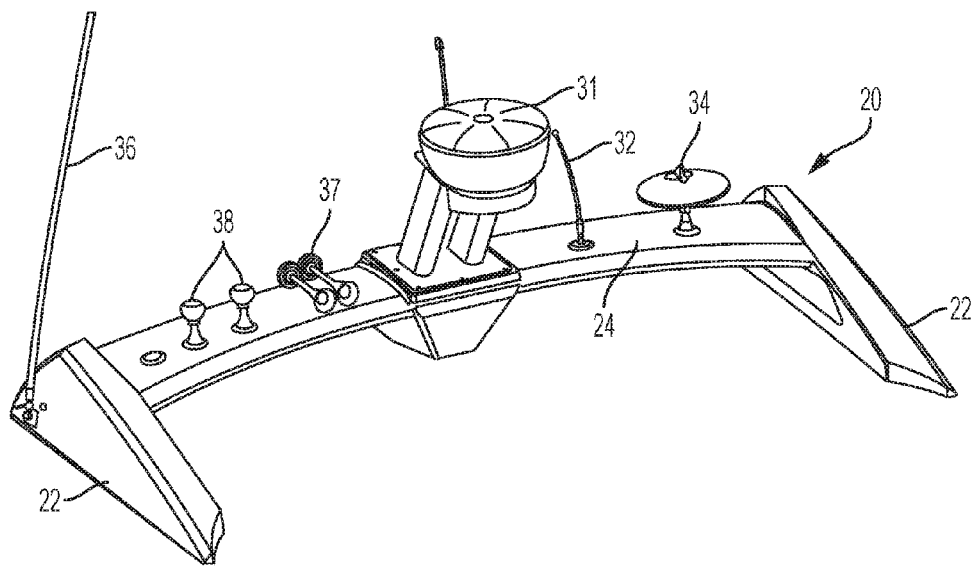
FIG. 20 illustrates accessory components which are mounted upon a spoiler arch of the instant invention.
Figure 21:
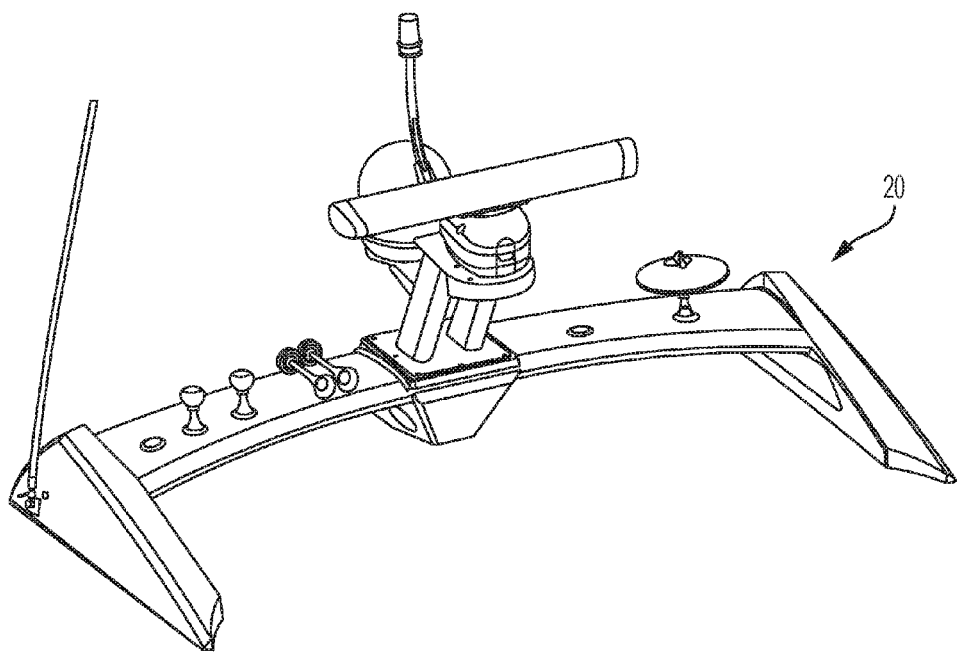
FIG. 21 illustrates alternate accessory components which are mounted upon a spoiler arch of the instant invention.

Yet another significant aspect of the present invention involves providing a superstructure-integrated spoiler system 20 for mitigating backspray wherein the integration of the spoiler and superstructure further allows for the mounting of marine hardware such as radar equipment and systems, horns, lights, antenna as illustrated in FIGS. 20 and 21. In accordance with this aspect, superstructure integrated spoiler 20 is fabricated as a double wall structure, having upper and lower structure members referenced as 21A and 21B, as best seen in the exploded view of FIG. 16. Upper and lower structures 21A and 21B are configured for nested mating attachment wherein interior space is defined between portions thereof for allowing access and cable and wire routing space. Fabricating spoiler 20 as a double wall structure allows for providing spacing between adjacent surfaces and access openings to allow for installation of fasteners, mounting hardware, and the running of wire and cables. Spoiler 20, and particularly side structural members 22, arch 24, and center mount 36 may further be provided with specially configured and/or hardened mounting locations, each referenced as 30, as illustrated in FIG. 15. Mounting locations 30 may comprise cut-out openings, pre-drilled holes, or reinforced areas to support additional loads. FIG. 20 illustrates the mounting of radar equipment 31, antenna 32, 34, and 36, horns 37 and lights 38. FIG. 21 illustrates an alternate configuration of mounted marine systems and hardware. To facilitate the mounting of such equipment, spoiler 20 defines a plurality of access openings within the interior and/or under side of the apparatus. For example, FIGS. 5, 10, 16, 17 and 18 illustrate access openings formed in lower spoiler structure member 21B which provides access to the space defined between upper and lower structure members 21A and 21B, and which are preferably generally aligned with mounting locations 30 found on upper structure 21A. Similarly, access openings, referenced as 42 are defined in side structural members 22 as seen in FIGS. 5, 7, 8, 10, 16, and 17. In addition, one or more access openings 44 may be formed in the bottom surface of each of side structural members 22 for routing of wires and cable from spoiler 20 to the vessel 12.

Figure 22:
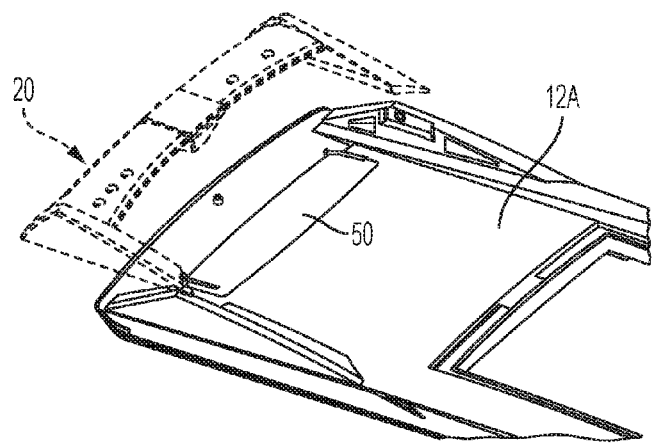
FIG. 22 is a top perspective view of an alternative embodiment of the spoiler of the instant invention in conjunction with the vessel's hardtop.
Figure 23:
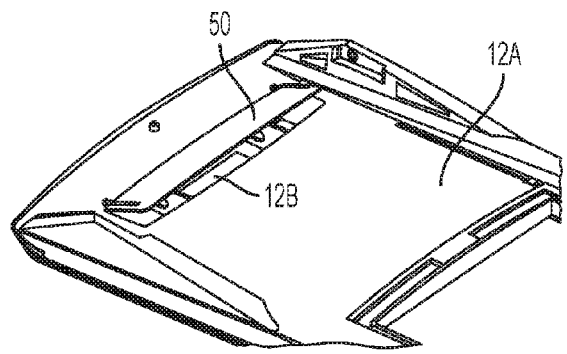
FIG. 23 is an alternative partial top perspective view of the apparatus shown in FIG. 23 with an operable hardtop flap shown in the open configuration.
Figure 24:
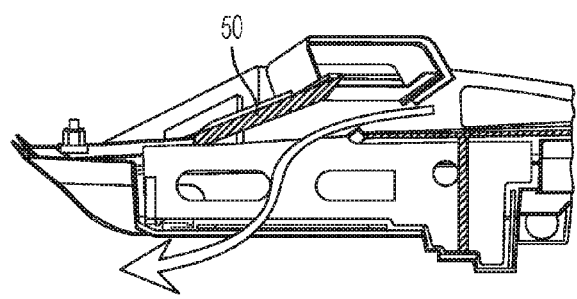
FIG. 24 is a partial cross-sectional side view depicting air flow created by the apparatus shown in FIG. 23.

FIGS. 22-24 illustrate a vessel hardtop 12A adapted with a mechanically actuated pivotally openable and closeable panel or flap, referenced as 50 in accordance with an alternate embodiment of the present invention. Flap 50 is disposed within a cutout 12B defined in hardtop 12A, and is configurable between a closed configuration as seen in FIG. 22, and an open configuration as seen in FIGS. 23 and 24. Flap 50 may extend substantially fully across the hardtop as illustrated in FIG. 22, or alternatively may extend only partially and/or may comprise two flap disposed on either side of center mount 26. Flap 50 may be actuated by any suitable means, including electric or hydraulic actuation. By adapting the superstructure integrated spoiler system 20 with a mechanically actuated flap 50, provides an additional operating mode. More particularly, with flap 50 in the closed position as shown in FIG. 22, the spoiler system operates as disclosed above. With flap 50 in the open configuration, however, an air stream may be diverted into a different, more forward, location within the cockpit through the opening 12B formed in hardtop 12A as illustrated in FIG. 24. Control of flap 50 may include automatic control means for opening and/or closing flap 50 based on vessel speed, or weather (e.g. rain or temperature), in addition to manual actuation. Complementary designs for water tracks and drains prevent rainfall and spray from flowing through the opening of the spoiler and into the cockpit area. This creates additional protection against undesirable elements penetrating into the cockpit area in the vessel is at rest, but does not inhibit the instant mitigation system when the vessel is underway.

While specific embodiments have been described in detail in the foregoing detailed description and illustrated in the accompanying drawings, those with ordinary skill in the art will appreciate that various modifications and alternatives to those details could be developed in light of the overall teachings of the disclosures. Accordingly, the particular arrangements disclosed are meant to be illustrative only and not limiting of the invention, which is to be given the full breadth of the appended claims, and any and all equivalents thereof.

What is claimed is:

1. Superstructure-integrated backspray mitigation apparatus for a marine vessel, said apparatus comprising:
   a yacht having a superstructure including a hardtop, and a cockpit area;
   a spoiler integrated with said superstructure that redirects airflow from above said hardtop to an area below said hardtop in proximity to said cockpit area;
   said spoiler having a leading edge and a trailing edge, and defining at least one air ducting channel disposed between said leading edge and said trailing edge;
   said air ducting channel receiving air passing over said hardtop at said leading edge, and discharging said air from said trailing edge in proximity toward an aft end of said cockpit area thereby mitigating backspray from entering said cockpit area.

2. The apparatus of claim 1, wherein said spoiler trailing edge protrudes rearwardly from said hardtop and above said cockpit area.

3. The apparatus of claim 1, wherein said cockpit area includes a salon entrance defined by a closure, and said spoiler redirecting airflow from above said hardtop into said cockpit area aft of said salon closure.

4. The apparatus of claim 1, wherein said air ducting channel discharges air in a downward and rearward direction at an angle between 45° and 75° below horizontal.

5. The apparatus of claim 1, wherein said air ducting channel defines a variable cross-sectional area that decreases when measured from said leading edge to said trailing edge.

6. The apparatus of claim 1, wherein said spoiler further includes left and right side structural members, and a spoiler arch extending between said left and right side structural members.

7. The apparatus of claim 6, wherein said spoiler further includes means for mounting of accessory hardware and systems.

8. The apparatus of claim 7, wherein said spoiler is fabricated as a spaced double wall structure, and defines access openings to provide access to an interior space defined between said double wall structure.

9. A backspray mitigation apparatus for a marine vessel having a hardtop and a cockpit area located below the hard top, said apparatus comprising:
   a spoiler with mounted to the vessel hardtop;
   said spoiler having a leading edge and a trailing edge, and defining at least one air ducting channel means for ducting air between said leading edge and said trailing edge;
   said means for ducting air adapted to receive air passing over the vessel hardtop at said leading edge, and discharging said air below the vessel hardtop in an aft direction in proximity to the cockpit area thereby mitigating backspray from entering the cockpit area.

10. The apparatus of claim 9, wherein said spoiler trailing edge protrudes rearwardly from said hardtop and above said cockpit area.

11. The apparatus of claim 9, wherein said means for ducting air discharges air in a downward and rearward direction at an angle between 45° and 75° below horizontal.

12. The apparatus of claim 9, wherein said means for ducting air defines a variable cross-sectional area that decreases when measured from said leading edge to said trailing edge.

13. The apparatus of claim 9, wherein said spoiler further includes left and right side structural members, and a spoiler arch extending between said left and right side structural members.

14. The apparatus of claim 13, wherein said spoiler further includes means for mounting of accessory hardware and systems.

15. The apparatus of claim 14, wherein said spoiler is fabricated as a spaced double wall structure, and defines access openings to provide access to an interior space defined between said double wall structure.

16. A superstructure-integrated backspray mitigation apparatus for a marine vessel having a hardtop and a cockpit area disposed below the hardtop, said apparatus comprising:
   a spoiler that redirects airflow from above said hardtop to an area below said hardtop in proximity to said cockpit area;
   said spoiler including left and right left and right side structural members attached to the vessel hardtop, and an arch extending between said left and right side structural members, said arch having an upper surface, and a lower surface disposed in vertically spaced relation with the vessel hardtop;
   said spoiler arch defining a leading edge disposed above the vessel hardtop, and a trailing edge disposed rearwardly of the hardtop and above the cockpit area;
   an air ducting channel having an inlet and an outlet;
   said inlet disposed at said leading edge, said air ducting channel inlet having: an upper boundary defined by the lower surface of said arch; a lower boundary defined by the vessel hard top; and opposing side boundaries defined by said left and right side structural members;
   said outlet being angularly oriented to discharge air downward and rearward relative to the hardtop;
   said air ducting channel inlet receiving air passing over said hardtop due to movement of the vessel, and said air ducting channel outlet discharges said air below the hardtop in proximity to said cockpit area thereby mitigating backspray from entering said cockpit area.

17. The apparatus of claim 16, further including a center mount disposed between said left and right side structural members, and having a lower portion affixed to the vessel hardtop and an upper portion affixed to said arch, whereby said center mount divides said air ducting channel inlet.

18. The apparatus of claim 16, wherein said cockpit area includes a salon entrance defined by a closure, and said spoiler redirecting airflow from above said hardtop into said cockpit area aft of said salon closure.

19. The apparatus of claim 16, wherein said air ducting channel discharges air in a downward and rearward direction at an angle between 45° and 75° below horizontal.

20. The apparatus of claim 16, wherein said air ducting channel defines a variable cross-sectional area that decreases when measured from said leading edge to said trailing edge.

21. The apparatus of claim 16, further including accessories mounted to the upper surface of said arch.

22. The apparatus of claim 16, wherein the hardtop defines an opening, and a an openable flap disposed in covering relation with said opening, said flap mechanically actuated between a closed position wherein said flap is disposed on flush covering relation with said opening, and an open position wherein said flap divert air from said air ducting channel through said opening.

* * * * *